June 21, 1927.
A. L. FRIEBURG
1,632,958
CULTIVATOR BLADE
Filed July 14, 1926
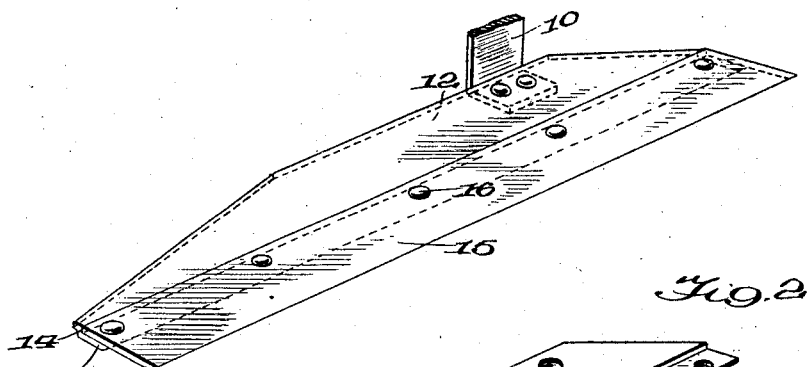
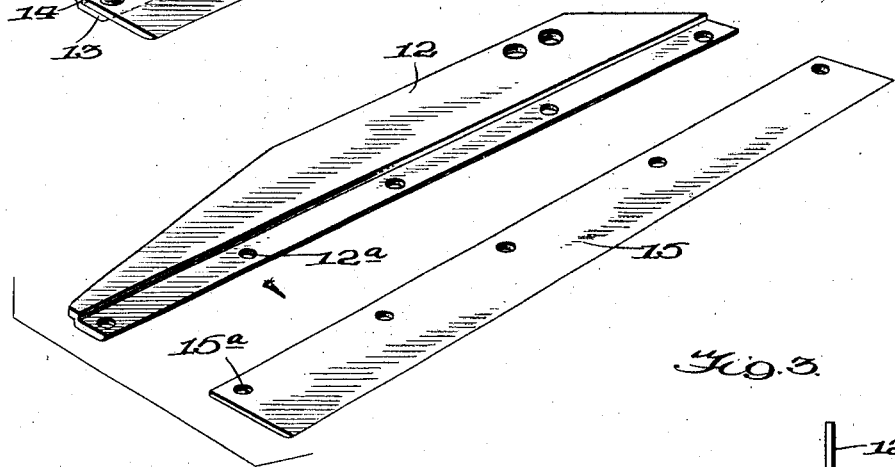
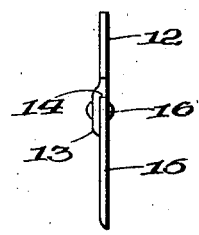
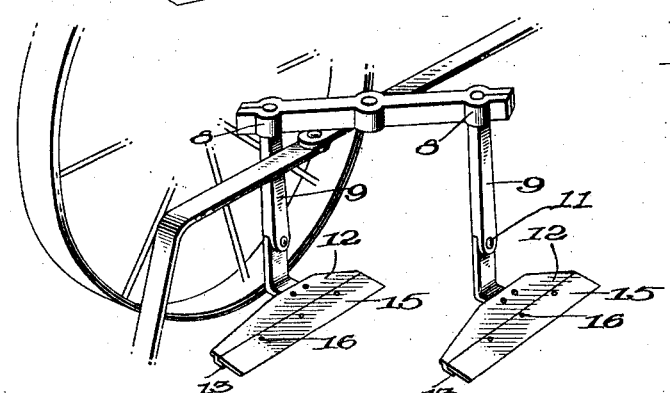
Inventor
A. L. FRIEBURG,
By Milo B. Stevens & Co.
Attorney Patented June 21, 1927.

1,632,958

UNITED STATES PATENT OFFICE.

ALFRED L. FRIEBURG, OF GIBSON CITY, ILLINOIS.

CULTIVATOR BLADE.

Application filed July 14, 1926. Serial No. 122,468.

My invention relates to improvements in cultivators such as are used in cultivating corn and the like.

Cultivators of this class are provided with what are known as surface blades. These are designed to scrape along the surface of the ground or just below the surface to loosen the soil, cut weeds, and by adjustment they may be arranged to throw the soil up around the row of corn. Naturally such blades are subjected to very hard use and in order to secure satisfactory results the blades must be frequently removed and sharpened or new ones put in their steads.

It is therefore the primary object of my invention to provide a novel form of surface or scraping blades which includes a carrier member which may be of relatively soft iron, steel or low grade metal and a cutting member of very hard steel, a novel means being provided for detachably uniting these members so that they will successfully withstand the hard usage to which they are subjected, the cutting member being so fastened to the carrier member that it may be readily removed therefrom as occasion may require.

In the drawing,

Figure 1 is a perspective view of an improved surface or scraping blade constructed in accordance with my invention;

Figure 2 is a group perspective view of the carrier member and cutting blade;

Figure 3 is a cross sectional view, and

Figure 4 is a perspective view showing a part of a cultivator and the application of my invention thereto.

Referring specifically to the drawing wherein the same reference characters designate similar parts in all views, numeral 5 denotes a part of the frame of a wheel cultivator of familiar design the same having a cross member 7 with bearings 8 at each end for the reception of the shanks 9 of the surface blades or ground engaging scraper members.

In the present instance the scraper members comprise two elements, a carrier 12 and a cutting blade 15. The carrier, as previously stated, will be of relatively cheap metal and it is provided with an ear 10 which is suitably apertured and adjustably fastened to the shanks 9, as indicated at 11.

As clearly shown in the drawing the carrier member is provided with an offset which is coextensive with its length and produces a flange 13 and a shoulder 14. The blade 15 rests upon the flange 13 and projects beyond the front portion thereof. The rear edge of the blade 15 engages the shoulder 14 and the two elements are fastened together by means of rivets 16 or otherwise as clearly shown. By this construction a very rigid and satisfactory structure is produced,—one which will effectually withstand constant use in stony soil and which will be equally as durable as the usual form of one piece blade. The shoulder 14 snugly engages the back edge of the blade 15 and the rivets 16 serve to hold the assembly intact. It is to be noted that the top surface of the blade 15 lies in the same plane as the surface of the carrier member 12. A plane surface of considerable area is thus produced and the blades may be adjusted in the usual manner and their effective action upon the soil may be accurately controlled. There will be no substantial protuberances or obstructions to deflect the soil or severed weeds and other vegetations in an undesired direction.

When the blades 15 have become dulled they can be readily removed by merely knocking out the rivets 16.

Having thus described my invention, what I claim as new and desire to secure by Letters Patent is:

In a cultivator for corn and the like a horizontally disposed ground engaging scraper member comprising a base element of uniform thickness throughout and having a substantially plane top surface and means for attachment to the cultivator frame, said base element comprising a metal stamping having an offset adjacent its forward edge defining a shoulder and a supporting flange, a cutting blade supported upon said flange and having its active edge projecting beyond the forward edge of said flange, the back edge of said cutting blade engaging said shoulder, the said cutting blade being of a thickness equal to the height of said shoulder and the thickness of said base element whereby its upper surface will lie flush with the upper surface of said base element to define a plane unbroken surface, and the lower surface of said assembled blade and base element being of substantially uniform thickness and broken only by said offset, the latter being a substantial distance rearwardly of the active edge of said blade whereby to avoid interference with the action thereof and the free transverse passage of soil and severed weed roots.

In testimony whereof I affix my signature.

ALFRED L. FRIEBURG.